(12) United States Patent
Negre et al.

(10) Patent No.: US 8,149,931 B2
(45) Date of Patent: Apr. 3, 2012

(54) MULTI-CARRIER TRANSMISSION PROCESS AND SYSTEM IN A DIFFICULT ENVIRONMENT WITH OPTIMISATION OF EMISSION POWER

(75) Inventors: Jean-Eric Negre, Verrieres le Buisson (FR); Emmanuel Senechal, Longpont sur Orge (FR); Luc Fety, L'Epine Au Bois (FR); Michel Terre, Paris (FR)

(73) Assignee: Sercel, Carquefou (FR)

( * ) Notice: Subject to any disclaimer, the term of this patent is extended or adjusted under 35 U.S.C. 154(b) by 1154 days.

(21) Appl. No.: 11/999,467

(22) Filed: Dec. 4, 2007

(65) Prior Publication Data

US 2008/0215655 A1     Sep. 4, 2008

(30) Foreign Application Priority Data

Dec. 5, 2006   (FR) ..................................... 06 10615

(51) Int. Cl.
*H04K 1/10* (2006.01)
(52) U.S. Cl. ........................................ 375/260; 375/140
(58) Field of Classification Search .................. 375/140, 375/141, 296, 260
See application file for complete search history.

(56) References Cited

U.S. PATENT DOCUMENTS

| 6,785,258 B1 | 8/2004 | Garcia, Jr. et al. | |
|---|---|---|---|
| 2002/0172184 A1* | 11/2002 | Kim et al. | ..................... 370/344 |
| 2004/0093545 A1 | 5/2004 | Khandani et al. | |

FOREIGN PATENT DOCUMENTS

WO   WO 2006-068543   6/2006

* cited by examiner

*Primary Examiner* — Kevin Kim
(74) *Attorney, Agent, or Firm* — Blakely, Sokoloff, Taylor & Zafman

(57) ABSTRACT

The invention proposes a data transmission process, from a first unit (1) situated at a predetermined depth of an oil well to a second unit (2) situated at the surface of this well, the process comprising a digital-analog conversion stage (8) of the data to obtain an analog signal forming support of the data, and an amplification stage (9) of this signal prior to its emission in a cable (11) connecting the two units, characterized in that at least two distinct scramblings (20, 21) of the data are completed, such that there is a first and a second set of scrambled data. After passage in a single complex inverse Fourier transform, that intended for emission is selected (26), whereof the dynamic in amplitude is the lowest. If the probability of saturating with a single set is $10^{-q}$, then due to this process the probability will be $10^{-2q}$.

15 Claims, 2 Drawing Sheets

Figure 1:
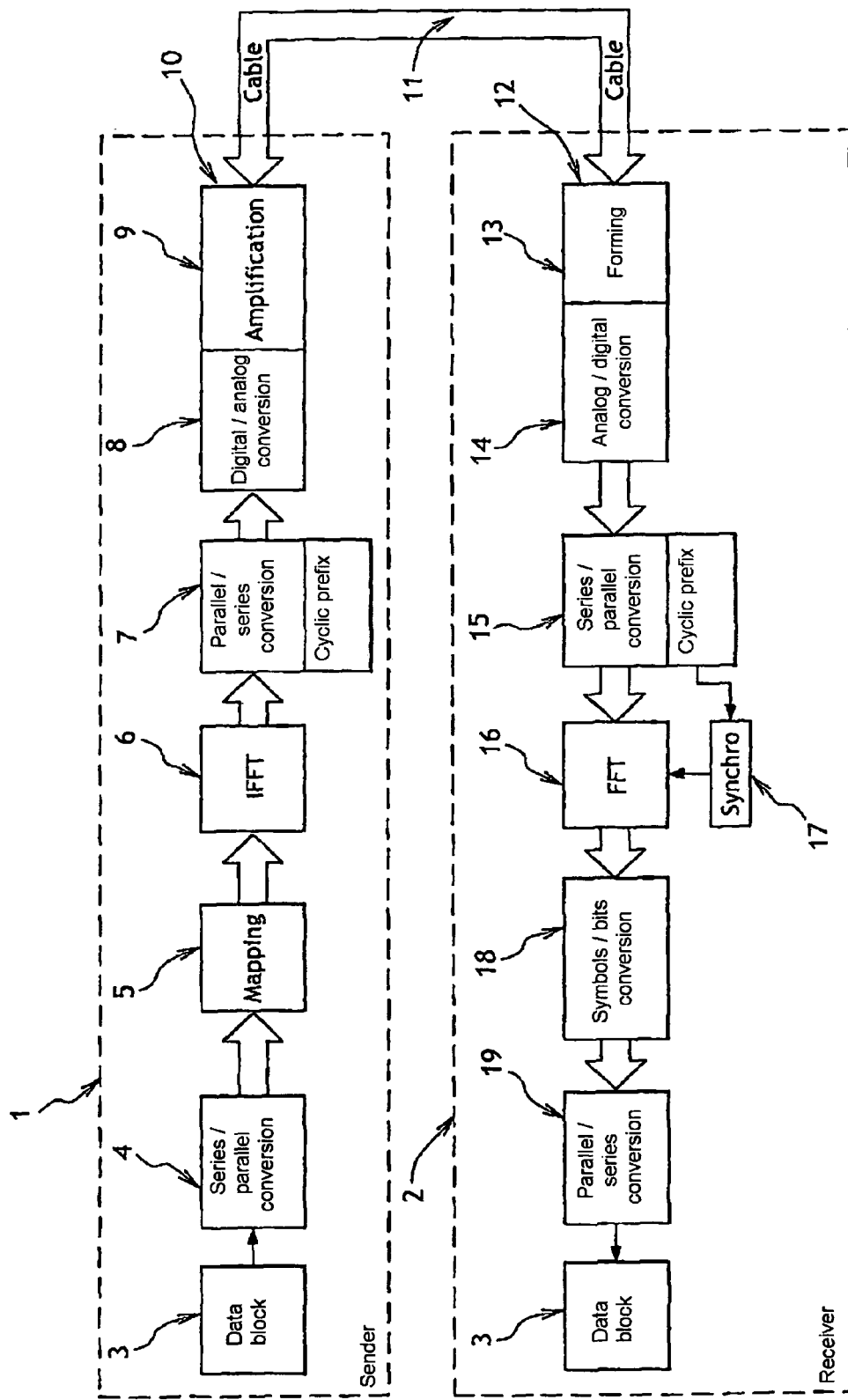

MULTI-CARRIER TRANSMISSION PROCESS AND SYSTEM IN A DIFFICULT ENVIRONMENT WITH OPTIMISATION OF EMISSION POWER

INTRODUCTION

The present invention relates to data transmission systems and processes.

In particular, the invention has advantageous application in the case of data transmission in oil wells between a first unit situated at a predetermined depth and a second unit situated at the surface of the well.

The system according to the invention has communication means for sending/receiving signals.

The invention is particularly well adapted to use in a difficult environment.

In the case of application to oil wells, the second unit situated in the well is in a particularly aggressive environment (high temperature, corrosive gas, confinement, limited template, etc.).

This applicative environment sharply reduces the means to be employed in this same unit (available calculating power, feed, dissipation, etc.).

The first unit and the second unit are for example connected by a cable called a <<tanker>>, very solid, typically a heptacable of a length capable of stretching from several kilometres to tens of kilometres.

This cable offers numerous functions: mechanical support, power feed, communications support.

It should be noted that this type of cable is not designed, initially and in light of its length, for high-rate data transport.

In fact, the passband of this cable is relatively limited since it is principally the mechanical qualities and the multi-conductive aspect which are preferred to the detriment of communication qualities.

Another type of cable exists, the most recent coaxial cable having much better characteristics for high-rate communications.

This type of cable is currently in minimal use in data transmission applications in oil wells.

Identification of Needs

The current tendency observed is clearly an increase in rate needs.

Augmentation of the resolution of measurements, growth in the number of measuring points made in the well and thus of the quantity of data to be collected by the telemetry unit (second unit for sending measuring data) are the principal levers.

The need for greater flexibility as well as greater reliability from all types of cable should also be noted.

The capacity to better manage external perturbations such as parasitic frequencies which might pollute the frequential spectrum should also be focussed on.

Identification of the Advantages and Disadvantages of Mono-Carrier and Multi-Carrier Techniques In light of such needs, transmission techniques of multi-carrier type turn out to be very advantageous, to the detriment of more classic mono-carrier techniques simpler to implement.

One of the multi-carrier techniques is OFDM (acronym for the English expression <<Orthogonal Frequency Division Multiplexing>>).

The advantages of this type of modulation are many.

Due to its plurality of carriers, OFDM permits better spectral occupation of the distribution channel (for example a cable) and this as a function of its attenuation for each carrier.

OFDM also absorbs the parasitic frequencies often present on the well and capable of polluting the spectrum.

However, the fact that the amplitude of the OFDM signal is not limited represents a serious impediment to its physical implementation with the electronic components.

Since feeds and amplifiers are considerably limited especially due to the difficult environment described previously, the OFDM signal will thus sometimes be excreted and deteriorated since is exceeds emission capacity and this according to occurrence depending on the maximum factor admissible by equipment (it should be noted that clipping causes a fairly large quantity of errors according to its amplitude).

The factor of maximum crest admissible by the equipment is the ratio between the maximum power available and the average power output.

This power ratio needs to be minimised to optimise the rate while retaining a preferred reception error rate.

In fact, the lower the maximum crest factor admissible by the equipment the greater the probability of peaking increases.

The adjustment of this parameter is thus a compromise between rate and preferred error rate.

For this purpose, the applicant proposes simple means for diminishing the saturation probability of the OFDM signal with the aim of optimising emission power.

In fact, since the invention diminishes the probability of saturating, the crest factor admissible by the equipment can be diminished, thus augmenting the rate while conserving the preferred error rate.

Further this process is simple to implement to enable implementation in well tools subjected to high temperatures and dimensional constraints (limitation of calculation power, for example).

In fact, within the scope of applications to oil wells, the electronics placed at the bottom of the well must be able to maintain local environmental conditions and in particular temperatures reaching some 180 degrees Celsius, not generally the case for electronics utilised in multi-carrier transmission systems.

In fact, on one hand the electronics in place in the case of multi-carrier system are much more complex than those utilised in the case of low-rate transmission, for example. And also, in such temperature conditions the amplifiers and the converters have very limited performance.

BASIS OF THE INVENTION

To eliminate the above problems, the present invention proposes more precisely a data transmission process, from a first unit to a second unit, the process comprising a digital-analog conversion stage of data so as to obtain an analog signal forming support for the data, and an amplification stage of this signal prior to emission in a cable connecting the two units, characterised in that:

Stage 1—at least two distinct data scramblings are performed, such that there is a first and a second set of scrambled data.

Stage 2—the inverse Fourier transforms of the first and second sets of scrambled data are determined from real and imaginary parts of a single complex inverse Fourier transform. This slightly particular utilisation of the Fourier transform in our application allows for not doubling the necessary power despite the presence of these two data sets.

Stage 3—the maximum dynamic for each of the two sets of scrambled data leaving the inverse Fourier transform is determined, and any one of these sets is selected if said dynamics are compatible with the maximum dynamics authorised or if any of the two sets is compatible, the set which will engender the lowest saturation so as to minimise the induced errors.

Stage 4—the process further comprises a stage where a supplementary datum intended to indicate to the second unit the result of the selection made at stage 3 is sent; the datum corresponds to one bit, of which the values '0' and '1' respectively identify one and the other of these two scramblings; the supplementary datum is sent according to modulation of type BPSK.

PRESENTATION OF FIGURES

Figure 2:
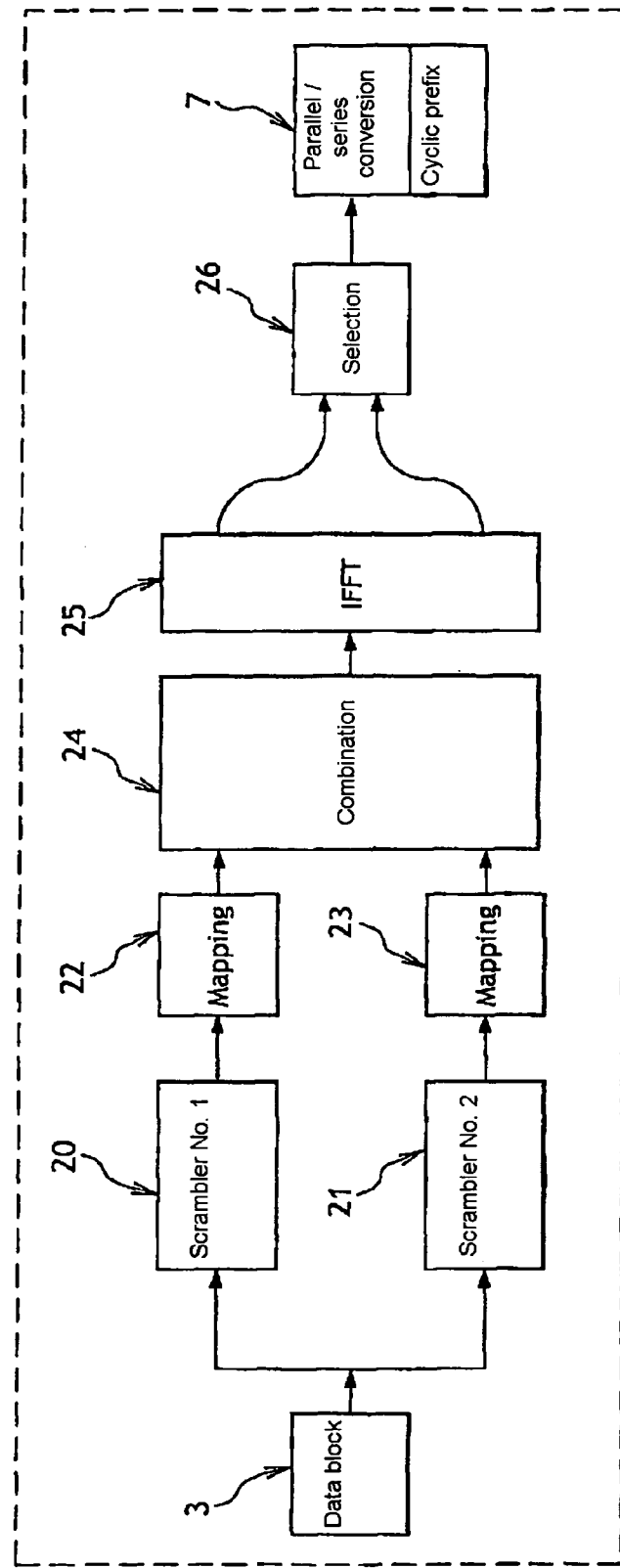

Other characteristics and advantages of the invention will emerge from the following description which is purely illustrative and non-limiting and must be viewed in terms of the attached diagrams, in which:

FIG. 1 illustrates a multi-carrier transmission system such as known in the prior art, FIG. 2 illustrates modules using the stages of the embodiment of the process according to the invention.

DESCRIPTION OF THE INVENTION

To facilitate comprehension of the following description both a complex inverse Fourier transform and an IFFTc will be designated in this text in an undifferentiated manner.
Classic Multi-Carrier Transmission (FIG. 1)

The simple object of the description made hereinbelow is to briefly specify aspects well known to the specialist, but which will allow better comprehension of the invention.

The multi-carrier transmission system of FIG. 1 comprises two units 1 and 2.

For example, the first unit 1 can be arranged at the surface of a oil well and the second unit 2 at a certain depth of an oil well.

It is understood that the two units 1 and 2 can be at different altitudes.

In addition, according to the conditions of use the first unit is situated at the surface of the oil well and is at ambient temperature, while the second unit is situated at a certain depth of the well and can thus be subjected to high temperatures, for example of the order of 180° C.

These two units are suitable for communicating and in particular transmitting data by means of a communication channel 11, for example in a standard cable.

By way of non-limiting example it is supposed that the unit 1 sends while the unit 2 receives.

In this case, forming a signal representative of the data makes use of different modules known per se and represented in particular in FIG. 1.

In this figure, a block of initial binary data 3 is supplied to a series-parallel converter 4.

As it leaves this converter the parallelised data undergoes <<mapping>> in an adapted device 5.

The <<mapping>> consists simply of transforming a binary word of p bits into a complex symbol belonging to an alphabet of $2^p$ possible complex numbers.

The data then enter a module 6 to perform inverse Fourier transform (IFFT) on N points.

The data are then <<serialised>> by means of a parallel-series converter 7.

The serialised data are then supplied to a digital-analog converter 8.

The analog signal leaving this converter 8 is then amplified by means of an amplifier 9, prior to being sent to the channel 11 in the form of a signal 10.

At the other end of the cable, or equivalent to the other end of the channel 11, the second unit receives the signal 12 on entry.

The signal typically undergoes first forming 13 prior to being converted into data in an analog-digital converter 14.

On leaving the module 15 the data then transits to a synchronisation module 17.

Fourier transform is then applied to these data in a module 16, after which a classic stage is used for converting symbols into bits 18. This is the inverse operation of the <<mapping>> done at emission.

The result is a block of binary data transmitted to a parallel-series converter 19.

These binary data then form received message.

It should be noted that without transmission errors this block is rigorously identical to the block of data sent.
Multi-Carrier Transmission Including the Invention (FIG. 2)

Now that a classic transmission system of multi-carrier type has been presented, a preferred embodiment of the process according to the invention will now be described in detail.

One problem associated with this type of transmission is that the signal 12 in reception has an extremely fluctuating envelope.

From the statistical viewpoint it is known that signals 12 of this type can be seen as a sum of random independent signals (the bits modulating the different carriers are random and independent).

Accordingly, by application of the central limited theorem, this type of signal sent tends towards a random signal of density of gaussian probability, of zero average and $\sigma^2$ variance.

This gaussian is truncated, and it is a sum finished with random independent limited signals which is sent.

Because of this it can be deduced that, in the worst case, all the power distributed over the inputs of the module 6 concentrates at a single one of its outputs. Therefore, in practice very strong digital values (in absolute value) are obtained fairly frequently.

As these values are supplied to the digital-analog converter 8, they can be represented only over a limited number of bits.

It is thus necessary here to effect a compromise between the maximum value representable, noted $U_{max}$ by the converter 8, which would preferably have to be the greatest possible, and the quantification pitch δ which would preferably have to be very small.

In general, for a digital-analog converter, it is known that these two quantities can be connected by an equation of the type $$\delta = \frac{2U_{max}}{M},$$

where M represents the number of bits of this converter.

It will be ensured in the conception to fix $U_{max}=\alpha\sigma$, $\alpha$ being a real number which according to the invention is preferably greater than three.

Therefore, all values between $-\alpha\sigma$ and $\alpha\sigma$ ought not to be saturated.

It will also be ensured that these values are compatible with the performances of the amplifier 9.

It is in fact necessary that the entire converter 8 and amplifier 9 are not saturated.

According to the invention, this probability, which is in principle equal to $10^{-q}$, can be reduced to a value close to $10^{-2q}$.

For this purpose, it is proposed in general to select scrambling which, applied to the data of the block, will saturate the least possible the entire digital-analog converter 8 and amplifier 9.

The preferred mode of the process according to the invention is illustrated schematically in FIG. 2.

The data block 3 coming from the converter 4 is supplied, by duplication, to two distinct scramblers 20 and 21.

It is understood here that these two scramblers provide two sets of statistically independent scrambled data.

Scrambling is done by a logical <<or exclusive>> function known to the specialist.

The <<or exclusive>> scrambling is done between the block of original binary data and the output of a shift register, the purpose of which is to produce a pseudo-random signal. A shift register is, for example, based on a primitive polynome in the Galois body GF2.

In the case where the two scramblers correspond to the same shift register they can be differentiated by means of different initialisations.

These two sets are then supplied to two <<mapping>> modules 22 and 23 respectively.

After the <<mapping>> 22 the two sets of data pass through the combination module 24, producing the combination of the two sets prior to complete their inverse Fourier transform.

The two data blocks then transit to a module 25 in which complex inverse Fourier transform (IFFTc) is completed.

More precisely, the real part of this complex transform is used to determine the transform of one of the sets and the imaginary part for the other of the sets.

Even more precisely, the following elementary properties are used.

Let x(n) be a real signal.

It is known that its Fourier transform on N values is equal to:

$$X(k) = \sum_{n=0}^{N-1} x(n) e^{-\frac{j2\pi nk}{N}}.$$

This gives, X(0) which is real.

Plus, $X(k)=\text{conj}\{X(N-k)\}$ for $$k \in \left[1, \frac{N}{2} - 1\right].$$

Finally, $$X\left(\frac{N}{2}\right)$$

is real also.

Now let y(n) be a purely imaginary signal; its Fourier transform calculated on N points is equal to:

$$Y(k) = \sum_{n=0}^{N-1} y(n) e^{-\frac{j2\pi nk}{N}}.$$

This time, this gives Y(0) which is purely imaginary and $Y(k)=-\text{conj}\{X(N-k)\}$ for $$k \in \left[1, \frac{N}{2} - 1\right] \text{ and } Y\left(\frac{N}{2}\right)$$

which is purely imaginary.

According to these properties, it is easily shown that the two real Fourier transforms can be created by means of a single complex Fourier transform.

Consider for example that the aim is to calculate the Fourier transforms of two real signals $x_1(n)$ and $x_2(n)$.

A complex signal can then be formed:

$$z(n)=x_1(n)+jx_2(n).$$

The Fourier transform of this signal is thus:

$$Z(k) = \sum_{n=0}^{N-1} z(n) e^{-\frac{j2\pi nk}{N}}.$$

To regain the Fourier transform $X_1(k)$ and $X_2(k)$ of the real signals $x_1(n)$ and $x_2(n)$ from Z(k), the procedure should be as follows;

$$X_1(0) = \text{Real}\{Z(0)\},$$

$$X_1(k) = \frac{1}{2}(Z(k) + \text{conj}(Z(N-k))) \text{ for } k \in \left[1, \frac{N}{2} - 1\right], \text{ and}$$

$$X_1\left(\frac{N}{2}\right) = \text{Real}\left\{Z\left(\frac{N}{2}\right)\right\},$$

$$Y_1(0) = \text{Imag}\{Y(0)\},$$

$$Y_1(k) = -\frac{j}{2}(Z(k) - \text{conj}(Z(N-k))) \text{ for } k \in \left[1, \frac{N}{2} - 1\right],$$

$$Y_1\left(\frac{N}{2}\right) = \text{Imag}\left\{Z\left\{\frac{N}{2}\right\}\right\}.$$

Therefore, according to the invention, using complex properties of direct or inverse Fourier transform advantageously determines the direct or inverse Fourier transforms of the two sets of scrambled data without employing two modules of the type of module 6. The effect of this is to limit the complexity of the process according to the invention.

The two sets of data leaving the module 25 are then supplied to a selection module 26.

In the latter, stages are employed whereof the aim is to select which of the two sets are intended for emission via the cable 11, considering the maximum dynamics permitted known for the entire digital-analog converter 8 and amplifier 9.

According to the preferred mode, if the dynamic in amplitude of the two sets of data is compatible with the maximum dynamics permitted (it is provided that in the two cases there should have been no saturation of the entire digital-analog converter and amplifier), any one of these sets for emission is selected.

It must be understood here by <<compatible>> that the dynamic of a set must be included in the maximum permitted dynamics.

In the case now where it is determined that one of the dynamics is compatible with the maximum permitted dynamics but the other is not, the set of data with the compatible dynamic is selected for emission.

Finally, in the event where the two sets present an incompatible dynamic, that having the lower dynamic is selected for emission.

Therefore, the selection module 26 advantageously decreases the probability that saturation of the entire digital-analog converter and amplifier does not occur.

In fact, it can be hoped statistically that if $P_s$ is the probability of observing saturation on a block of 256 scrambled values, then the probability of observing saturation on a second scrambled block will be equal to $P_s^2$, where the scramblers are different in terms of the invention.

It is also evident that this reasoning applies equally well if the data block is duplicated, and if scrambling is carried out only on one of these duplicates.

In fact, if $P_s$ is the probability of observing saturation on the non-scrambled copy then the probability of again observing saturation on the scrambled copy will be equal to $P_s^2$, since, once again, scrambling renders these copies statistically independent.

It is accordingly understood that as a variant of this preferred embodiment the scrambler 21 could be omitted, for example.

In all cases, according to the preferred mode of the invention, when the set of scrambled data has been selected one bit is added after these data.

This bit will indicate to the receiving unit 2 which scrambler was used for emission.

For example, the bit '0' could correspond to the scrambler 20 and the bit '1' to the scrambler 21.

As will be understood, the receiving unit is thus aware in advance of such coding.

Therefore the receiving unit is suitable for regaining the sent data 3 from the scrambled data received.

Also, so a to ensure good reception of this bit, that is, that it can be decoded by the unit 2 with an extremely low error rate and if the corresponding probability of error can be considered as negligible, it can be sent on a carrier different to that utilised for the rest of the data. Modulation in two phase states will preferably be used (in English, <<Binary Phase Shift Keying>>, (BPSK)) with a strong power level.

Finally, the selected set of scrambled data is converted into an analog signal, which is amplified and sent to the cable 11.

Of course, the present invention is not at all limited to the embodiment described hereinabove and illustrated in the diagrams.

It is evident in particular that only the scrambler 20 or 21 was able to be utilised. All the same, according to the applicant using two scramblers statistically balances the sets of data supplied to the module 25 of inverse Fourier transform complex.

In another variant, more than two scramblers could be used. For example, if four scramblers are used, two calculation modules 25 of inverse Fourier transform complex will be used.

It is understood in this respect that the supplementary datum added to the selected set of data for indicating which scrambler was used for emission can be coded on a number of bits.

Therefore, despite the technical difficulties associated with using transmission of the multi-carrier type in the environmental conditions known to be critical, especially in oil wells, the applicant has determined simple means for increasing the rate while reducing the probability of saturation with a given crest factor.

The invention claimed is:

1. A data transmission process, from a first unit (1) to a second unit (2), the two units (1, 2) being in communication via a channel (11), the process comprising at least the following stages:
   digital analog conversion by means of a digital analog converter (8) of data to obtain an analog signal forming support of the data, amplification of said analog signal, prior to its emission via the channel (11) by means of an amplifier (9), characterised in that the process further comprises at least the following stages:
   completing at least two distinct scramblings (20, 21) of the data, such that there are at least two sets of scrambled data, determination of the inverse Fourier Transform of said at least two sets of scrambled data, determination of the dynamics in amplitude of each of said at least two sets of scrambled data after inverse Fourier Transform, selection (26) of one of the sets of scrambled data intended for emission among said inverse Fourier Transforms of the sets of scrambled data having a dynamic in amplitude compatible with the maximum permitted dynamics by the assembly formed by the digital analog converter (8) and the amplifier (9),
   wherein the inverse Fourier Transforms of said at least two sets of scrambled data are determined from real and imaginary parts of at least one complex inverse Fourier Transform (IFFTc, 25).

2. The transmission process as claimed in claim 1, characterised in that the dynamics in amplitude of said at least two sets of data are compatible with the maximum dynamics permitted by the assembly formed by the digital analog converter (8) and the amplifier (9), and in that any one of said at least two sets of scrambled data intended for emission is selected.

3. The transmission process as claimed in claim 1, characterised in that a single dynamic in amplitude of said at least two sets of data is compatible with the maximum dynamics permitted by the assembly formed by the digital analog converter (8) and the amplifier (9), and in that the single set of compatible scrambled data intended for emission is sent.

4. The transmission process as claimed in claim 1, characterised in that the dynamics in amplitude of said at least two sets of data are incompatible with the maximum dynamics permitted by the assembly formed by the digital analog converter and the amplifier, and in that the set of data among said at least two sets of data having the lowest dynamic intended for emission is selected.

5. The transmission process as claimed in claim 1, wherein if there are 2M scramblers, M.gtoreq.1, then M modules of inverse Fourier transform are utilised.

6. The transmission process as claimed in claim 1, 2, 3, 4 or 5 further comprising a stage where a supplementary datum intended to indicate to the second unit (2) the scrambler utilised for emission is sent.

7. The transmission process as claimed in claim 6, characterised in that the datum corresponds to a binary code known in advance by the second unit (2), whereof the values identify the different scramblings not employed.

8. The transmission process as claimed in claim 1, wherein the two scramblings only are completed, and the supplementary datum corresponds to a bit whereof the values '0' and '1' identify respectively one and the other of these two scramblings.

9. The transmission process as claimed in claim 8, wherein the supplementary datum is sent according to modulation of type BPSK.

10. The transmission process as claimed in claim 1, wherein the data is sent over a plurality of carriers.

11. The transmission process as claimed in claim 1, wherein the supplementary datum for identifying the scrambling is sent to a carrier different to those used for the rest of the data.

12. The transmission process as claimed in claim 1, characterised in that the first unit (1) is situated at an altitude different to the second unit (2).

13. The transmission process as claimed in claim 12, characterised in that the first unit (1) is situated at a predetermined depth of an oil well and in that the second unit (2) is situated at the surface of said oil well.

14. The transmission process as claimed in claim 12, characterised in that the first unit and the second (2) are connected by a cable forming a distribution channel for the data.

15. The transmission process as claimed in claim 14 characterised in that the cable is a hepta-cable or a coaxial cable.

* * * * *

UNITED STATES PATENT AND TRADEMARK OFFICE
CERTIFICATE OF CORRECTION

| | | |
|---|---|---|
| PATENT NO. | : 8,149,931 B2 | Page 1 of 1 |
| APPLICATION NO. | : 11/999467 | |
| DATED | : April 3, 2012 | |
| INVENTOR(S) | : Jean-Eric Negre et al. | |

It is certified that error appears in the above-identified patent and that said Letters Patent is hereby corrected as shown below:

In the Claims, Column 10, Claim 14, line 6, please delete "first unit and" and insert -- first unit (1) and --.

Signed and Sealed this
Eighteenth Day of September, 2012

David J. Kappos
*Director of the United States Patent and Trademark Office*